US012105446B2

(12) United States Patent
Sugiura et al.

(10) Patent No.: US 12,105,446 B2
(45) Date of Patent: Oct. 1, 2024

(54) IMAGE FORMING APPARATUS AND TRANSFER UNIT

(71) Applicant: FUJIFILM Business Innovation Corp., Tokyo (JP)

(72) Inventors: Satoya Sugiura, Kanagawa (JP); Makoto Ochiai, Kanagawa (JP); Shogo Hayashi, Kanagawa (JP); Sayaka Inoue, Kanagawa (JP); Yusuke Watanabe, Kanagawa (JP); Kenta Shingu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/871,979

(22) Filed: Jul. 24, 2022

(65) Prior Publication Data

US 2023/0152734 A1 May 18, 2023

(30) Foreign Application Priority Data

Nov. 18, 2021 (JP) ................................ 2021-188152
Jan. 17, 2022 (JP) ................................ 2022-005222

(51) Int. Cl.
*G03G 15/16* (2006.01)

(52) U.S. Cl.
CPC .................................. *G03G 15/161* (2013.01)

(58) Field of Classification Search
CPC .................................................... G03G 15/161
See application file for complete search history.

(56) References Cited

U.S. PATENT DOCUMENTS 6,328,155 B1 * 12/2001 Omura ................. G03G 15/167 198/813
2012/0128953 A1 * 5/2012 Kuraoka ................. B32B 27/20 428/215

(Continued)

FOREIGN PATENT DOCUMENTS

JP 2006091554 4/2006
JP 2007114392 5/2007
JP 2019070771 5/2019

*Primary Examiner* — Stephanie E Bloss
*Assistant Examiner* — Michael A Harrison
(74) *Attorney, Agent, or Firm* — JCIPRNET

(57) ABSTRACT

An image forming apparatus includes a photoconductor, a charging section that charges a surface of the photoconductor, an electrostatic charge image forming section that forms an electrostatic charge image on the charged surface of the photoconductor, a developing section that accommodates a developer containing a toner and develops the electrostatic charge image formed on the surface of the photoconductor by using the developer to form a toner image, a transfer section that includes an endless belt and transfers the toner image to a recording medium; and a cleaning section that includes a cleaning blade that comes into contact with a surface of the endless belt and performs cleaning of the surface of the endless belt with the cleaning blade, in which a dynamic friction coefficient μ between the endless belt and the cleaning blade is 0.10 or more and 0.25 or less, and the endless belt has an outer peripheral surface on which an uncharged toner is scattered by a wind force of wind pressure of 23 kPa or smaller at a temperature of 22° C. and relative humidity of 55%.

19 Claims, 3 Drawing Sheets

(56) References Cited

U.S. PATENT DOCUMENTS

| | | | | |
|---|---|---|---|---|
| 2015/0277301 | A1* | 10/2015 | Takazawa .......... | G03G 15/0131<br>399/313 |
| 2020/0133171 | A1* | 4/2020 | Ishizumi ............ | G03G 15/1685 |

* cited by examiner

IMAGE FORMING APPARATUS AND TRANSFER UNIT

CROSS-REFERENCE TO RELATED APPLICATIONS

This application is based on and claims priority under 35 USC 119 from Japanese Patent Application No. 2021-188152 filed Nov. 18, 2021 and No. 2022-005222 filed Jan. 17, 2022.

BACKGROUND

(i) Technical Field

The present invention relates to an image forming apparatus and a transfer unit.

(ii) Related Art

JP2006-091554A discloses an image forming apparatus including an image holding member, a latent image forming section, a developing section, an intermediate transfer member, a primary transfer member, and a secondary transfer member. The image forming apparatus includes a brush as a toner removal section provided near the intermediate transfer member and the secondary transfer member. In a case where a tip force of the brush provided for the intermediate transfer member is set as Fb (IBT), and a tip force of the brush provided for the secondary transfer member is set as Fb (BT), a relationship of Fb (IBT)>Fb (BT) is satisfied.

JP2007-114392A discloses an image forming apparatus using an intermediate transfer member having an elastic layer. An angle $\alpha$ formed by a rising shape formed on an upstream side of a moving direction of the elastic layer from a pressing sliding contact point at which the elastic layer is elastically deformed by pressing and sliding with respect to a vertical line is larger than an angle $\theta$ formed by a contact surface of a cleaning blade with respect to the vertical line perpendicular to a generating line of the elastic layer at a pressing sliding contact point at which the cleaning blade is pressed against and slides on the elastic layer.

JP2019-070771A discloses a fixing belt including a base layer made of a heat-resistant resin, an intermediate layer arranged on the base layer and made of a heat-resistant elastic material, and a surface layer arranged on the intermediate layer and made of a fluororesin. A plurality of periodically formed convex portions are arranged on the surface of the surface layer, and the plurality of convex portions satisfies Expression (1) of $0.3 \leq a \leq 5.0$ and Expression (2) of $1.5 \leq b/a \leq 5.0$. In Expression (1), a is the peak-to-peak distance (μm) of the adjacent two convex portions, and b is the height (μm) of the peak.

SUMMARY

Aspects of non-limiting embodiments of the present disclosure relate to an image forming apparatus and a transfer unit that are less likely to cause a toner stain on a recording medium for a long term as compared with an image forming apparatus in which a dynamic friction coefficient $\mu$ between an endless belt and a cleaning blade is less than 0.10 or more than 0.25 or an image forming apparatus in which an endless belt has an outer peripheral surface requiring a wind force of wind pressure being larger than 23 kPa for scattering an uncharged toner at a temperature of 22° C. and relative humidity of 55%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a photoconductor; a charging section that charges a surface of the photoconductor; an electrostatic charge image forming section that forms an electrostatic charge image on the charged surface of the photoconductor; a developing section that accommodates a developer containing a toner and develops the electrostatic charge image formed on the surface of the photoconductor by using the developer to form a toner image; a transfer section that includes an endless belt and transfers the toner image to a recording medium; and a cleaning section that includes a cleaning blade that comes into contact with a surface of the endless belt and performs cleaning of the surface of the endless belt with the cleaning blade, in which a dynamic friction coefficient $\mu$ between the endless belt and the cleaning blade is 0.10 or more and 0.25 or less, and the endless belt has an outer peripheral surface on which an uncharged toner is scattered by a wind force of wind pressure of 23 kPa or smaller at a temperature of 22° C. and relative humidity of 55%.

BRIEF DESCRIPTION OF THE DRAWINGS

Exemplary embodiment(s) of the present invention will be described in detail based on the following figures, wherein.

DETAILED DESCRIPTION

Figure 1:
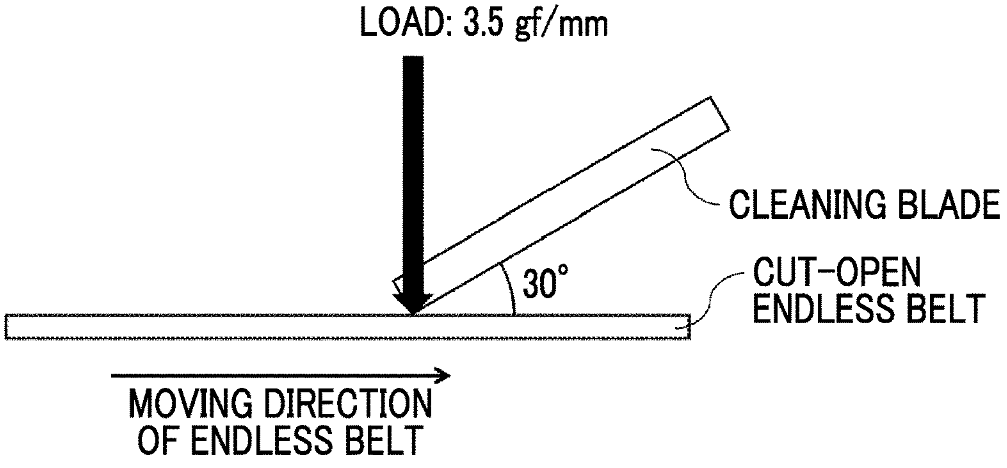
FIG. 1 is a schematic view illustrating a method of measuring a dynamic friction coefficient $\mu$ between an endless belt and a cleaning blade.

Hereinafter, an exemplary embodiment of the present disclosure will be described. Descriptions and examples illustrate the exemplary embodiment and do not limit the scope of the exemplary embodiments.

In the numerical range described stepwise in the present disclosure, an upper limit value or a lower limit value described in one numerical range may be replaced with an upper limit value or a lower limit value of another numerical range described stepwise. In the numerical range described in the present disclosure, an upper limit value or a lower limit value of the numerical range may be replaced with value described in the examples.

In the present disclosure, the term “step” includes an independent process. In addition, even in a case where it is not possible to clearly distinguish a step from another step, this step is included in this term so long as the purpose of this step is achieved.

In a case where the exemplary embodiment is described with reference to the drawings in the present disclosure, the configuration of the exemplary embodiment is not limited to the configuration illustrated in the drawings. The size of the member in each drawing is conceptual, and the relative relationship between the sizes of the members is not limited to the illustrations.

In the present disclosure, each component may contain a plurality of types of applicable substances. In a case where a plurality of types of substances applicable to each component in a composite are provided, the amount of each component in the composite in the present disclosure means the total amount of the plurality of types of substances provided in the composite unless otherwise specified.

Image Forming Apparatus

An image forming apparatus according to the present exemplary embodiment includes a photoconductor, a charging section that charges a surface of the photoconductor, an electrostatic charge image forming section that forms an electrostatic charge image on the charged surface of the photoconductor, a developing section that accommodates a developer containing a toner and develops the electrostatic charge image formed on the surface of the photoconductor by using the developer to form a toner image, a transfer section that includes an endless belt and transfers the toner image to a recording medium, and a cleaning section that includes a cleaning blade that comes into contact with a surface of the endless belt and performs cleaning of the surface of the endless belt with the cleaning blade, in which a dynamic friction coefficient μ between the endless belt and the cleaning blade is 0.10 or more and 0.25 or less, and the endless belt has an outer peripheral surface on which an uncharged toner is scattered by a wind force of wind pressure of 23 kPa or smaller at a temperature of 22° C. and relative humidity of 55%.

In the image forming apparatus according to the present exemplary embodiment, the endless belt is a secondary transfer belt or an intermediate transfer belt, and is appropriate for, for example, a secondary transfer belt.

The image forming apparatus according to the present exemplary embodiment is less likely to cause toner stains on a recording medium for a long term. The mechanism is considered as follows.

In a case where a toner accumulates on the endless belt forming the transfer section, the toner is crushed by the contact between the endless belt and the cleaning blade, and the toner is fixed to the surface of the endless belt (so-called filming). Then, in a case where the image formation continues, the endless belt contaminates the recording medium with the toner. In a case where toner filming occurs on the secondary transfer belt, the back surface (opposite surface of a surface on which an image has been formed) of the recording medium is contaminated. In a case where toner filming occurs on the intermediate transfer belt, the front surface (surface on which an image has been formed) of the recording medium is contaminated.

Under the situation described above, in a case where the dynamic friction coefficient μ between the endless belt and the cleaning blade is less than 0.10, the scraping force of the residual toner on the belt surface by the cleaning blade is insufficient, and thus cleaning failure occurs. From this viewpoint, in the present exemplary embodiment, the dynamic friction coefficient μ between the endless belt and the cleaning blade is equal to or more than 0.10. For example, the dynamic friction coefficient μ is preferably equal to or more than 0.11, more preferably equal to or more than 0.12, and further preferably equal to or more than 0.14.

In addition, in a case where the dynamic friction coefficient μ between the endless belt and the cleaning blade is more than 0.25, the contact surface pressure between the belt surface and the cleaning blade becomes excessive. Thus, the cleaning blade is worn, and the lifespan of the cleaning blade is shortened. From this viewpoint, in the present exemplary embodiment, the dynamic friction coefficient μ between the endless belt and the cleaning blade is equal to or less than 0.25. For example, the dynamic friction coefficient μ is preferably equal to or less than 0.22, more preferably equal to or less than 0.20, and further preferably equal to or less than 0.18.

On the other hand, in a case where the endless belt has an outer peripheral surface that requires a wind force of wind pressure being larger than 23 kPa for scattering the uncharged toner at a temperature of 22° C. and relative humidity of 55%, the non-electrostatic adhesive force of the toner to the belt surface becomes excessive, and thus toner removal is difficult. From this viewpoint, in the present exemplary embodiment, the endless belt has an outer peripheral surface on which the uncharged toner is scattered by a wind force having wind pressure of 23 kPa or smaller at a temperature of 22° C. and relative humidity of 55%. For example, the endless belt preferably has an outer peripheral surface on which the uncharged toner is scattered by a wind force having wind pressure of 19 kPa or smaller, and more preferably has an outer peripheral surface on which the uncharged toner is scattered by a wind force having wind pressure of 16 kPa or smaller.

From the viewpoint of suppressing toner contamination in the image forming apparatus, in the present exemplary embodiment, the endless belt has, for example, an outer peripheral surface on which the uncharged toner is not scattered with a wind force of wind pressure smaller than 5 kPa at a temperature of 22° C. and relative humidity of 55% (in other words, the outer peripheral surface requiring a wind force having wind pressure of 5 kPa or larger for scattering the uncharged toner).

A method of measuring the dynamic friction coefficient μ between the endless belt and the cleaning blade is as follows.

The endless belt is cut open and is placed on a stand of a friction force measuring device with setting the outer peripheral surface upward. The cleaning blade is brought into contact with the outer peripheral surface of the endless belt in parallel with a width direction of the endless belt and at an angle of 30 degrees with the endless belt. A load of 3.5 gf/mm (3.5 gf per 1 mm in the width direction of the endless belt) is applied to a contact portion between the endless belt and the cleaning blade. The endless belt is moved from the vicinity of one end to the vicinity of the other end of the endless belt at a speed of 100 mm/s in a direction of entering under the cleaning blade. A moving direction of the endless belt on the stand of the friction force measuring device coincides with a rotation direction of the endless belt in the image forming apparatus. The endless belt is moved and the dynamic friction force with the cleaning blade is measured to obtain the dynamic friction coefficient μ. The measurement is performed at a temperature of 22° C. and relative humidity of 55%. FIG. 1 is a schematic view illustrating the above measurement method.

The dynamic friction coefficient μ between the endless belt and the cleaning blade may be controlled by, for example, the material of the outer peripheral surface of the endless belt or the material of the surface of the cleaning blade.

The method of measuring the wind pressure at which the uncharged toner scatters from the outer peripheral surface of the endless belt is as follows.

The uncharged toner means a toner in which an absolute value of an average charge amount (μC/g) is equal to or less than 5.0. The uncharged toner is prepared, for example, by putting the toner into an erasing device (in a case where the toner is a negatively charged toner, a positive charge is applied). The average charge amount of the toner is checked by measuring 1000 toners with an E-SPART analyzer (Hosokawa Micron), for example.

The toner for preparing the uncharged toner is, for example, a toner in which a binder resin is a polyester resin, an external additive is silica particles, and the volume average particle size is 3.8 μm or more and 5.8 μm or less.

A portion of the endless belt is cut out or cut open, and is placed on a horizontal stand with setting the outer peripheral surface upward. 0.040 g of the uncharged toner is evenly placed in a 30 mm square on the surface of the endless belt. Air is blown from a nozzle having a tip diameter (inner diameter) of 3 mm in a direction perpendicular to the surface of the endless belt. A distance between the tip of the nozzle and the surface of the endless belt is 3 mm. The wind pressure is gradually increased while visually observing the surface of the endless belt. The wind pressure (kPa) at the tip of the nozzle in a case where the toner is no longer recognized on the surface of the endless belt (that is, in a case where the scattering of the entirety of the toner is completed) is specified. The measurement is performed at a temperature of 22° C. and relative humidity of 55%.

For measurement points, four points are provided at the central portion of the endless belt in the width direction and in a circumferential direction, at equal intervals. The maximum value among the wind pressure at the four points is set as the wind pressure at which the uncharged toner scatters from the outer peripheral surface of the endless belt.

The wind pressure at which the uncharged toner scatters from the outer peripheral surface of the endless belt may be controlled, for example, by the material of the outer peripheral surface of the endless belt or the surface roughness of the outer peripheral surface of the endless belt.

The configurations of the endless belt, the cleaning blade, and the image forming apparatus will be described below in order.

Endless Belt

Figure 2:
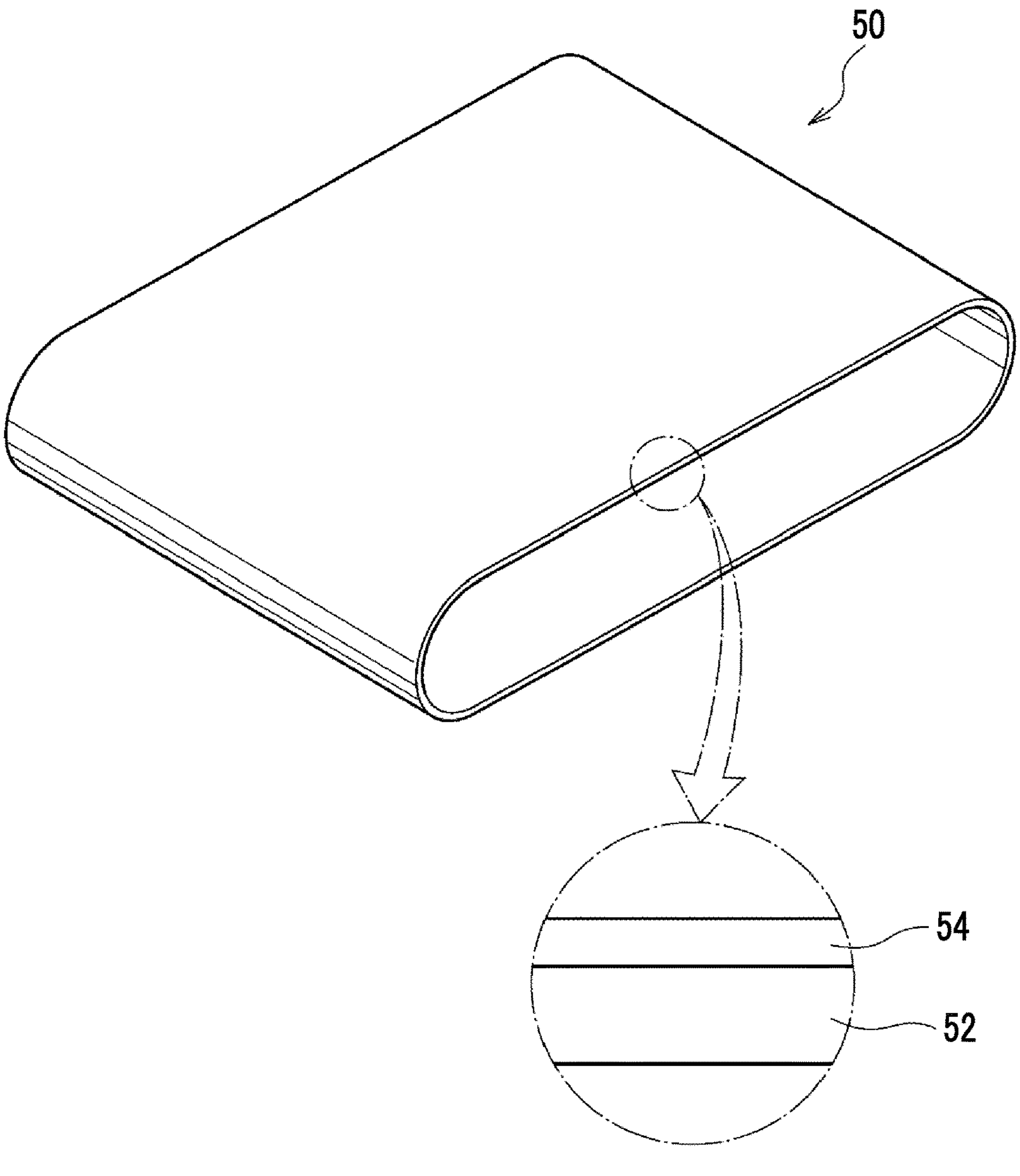
FIG. 2 is a perspective view schematically illustrating an example of the endless belt in an image forming apparatus according to an exemplary embodiment.

FIG. 2 is a perspective view schematically illustrating an example of the endless belt. An endless belt 50 illustrated in FIG. 2 includes a base material layer 52 and a surface layer 54. The surface layer 54 is a layer forming the outer peripheral surface of the endless belt 50. For example, a protective layer (not illustrated) may be provided on the inner peripheral surface of the endless belt 50.

Figure 3:
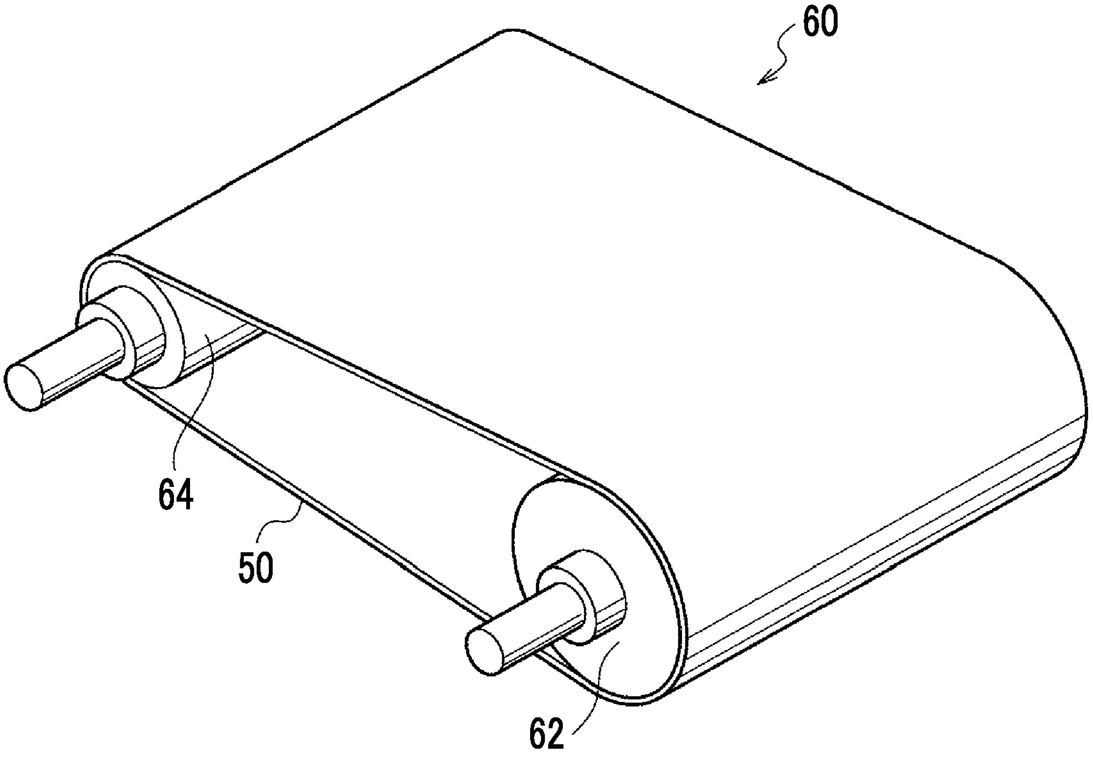
FIG. 3 is a perspective view schematically illustrating a state in which the endless belt in the image forming apparatus according to the present exemplary embodiment is hung on a roll member.

FIG. 3 is a perspective view schematically illustrating a state in which the endless belt is hung on a plurality of roll members. A belt unit 60 includes the endless belt 50, a drive roll 62, and a support roll 64. The belt unit 60 has a form in which the endless belt 50 is hung in a state where tension is applied to the drive roll 62 and the support roll 64 (also referred to as "tensioning" below). The drive roll 62 rotates by the power of a drive unit (not illustrated) connected to the drive roll 62. The endless belt 50 and the support roll 64 are rotated in accordance with the rotation of the drive roll 62.

The belt unit 60 is used by being incorporated in an electrophotographic image forming apparatus as a portion of the transfer section. The belt unit 60 forms a secondary transfer belt unit or an intermediate transfer belt unit. The belt unit 60 is appropriate for, for example, a secondary transfer belt unit. The number of roll members for tensioning the endless belt 50 in the belt unit 60 is not limited to two, and may be three or more.

Next, the layer configuration and the material of the endless belt will be described in detail.

Base Material Layer

The base material layer is preferably, for example, a film or sheet in which conductive particles are contained in a polymer material.

Examples of the polymer material include rubber and resin. The polymer material may be used singly or in combination of two or more kinds.

Examples of the rubber include chloroprene rubber, epichlorohydrin rubber, isoprene rubber, butyl rubber, polyurethane, silicone rubber, fluororubber, styrene-butadiene rubber, butadiene rubber, nitrile rubber (NBR), ethylene propylene rubber, and ethylene-propylene-diene ternary copolymer rubber (EPDM), natural rubber, and mixed rubber thereof.

Examples of the resin include polyamide, polyimide, polyamideimide, polyetherimide, polyether etherketone, polyphenylene sulfide, polyether sulfone, polyphenyl sulfone, polysulfone, polyethylene terephthalate, polybutylene terephthalate, polyacetal, polycarbonate, polyester, and mixed resins thereof.

Examples of the conductive particles include carbon black such as Ketjen black, oil furnace black, channel black, and acetylene black; metal particles of aluminum, nickel, and the like; and metal oxide particles of indium tin oxide, tin oxide, zinc oxide, titanium oxide, yttrium oxide, and the like. As the conductive particles, for example, carbon black is preferable. The conductive particles may be used singly or in combination of two or more kinds thereof.

The average primary particle size of the conductive particles is, for example, preferably 1 nm or more and 500 nm or less, more preferably 5 nm or more and 200 nm or less, and further preferably 9 nm or more and 25 nm or less.

The base material layer may contain a conductive agent other than the conductive particles. Examples of the conductive agent include ion conductive substances such as potassium titanate, potassium chloride, sodium perchlorate, and lithium perchlorate; and ion conductive polymers such as polyaniline, polyether, polypyrrole, polysulfone, and polyacetylene. The conductive agent may be used singly or in combination of two or more kinds thereof.

The base material layer is preferably, for example, a conductive elastic layer containing rubber and conductive particles, and is more preferably a conductive elastic layer containing carbon black and at least one of chloroprene rubber or epichlorohydrin rubber.

The total content of the conductive particles and the conductive agent contained in the base material layer is preferably set, for example, with the volume resistivity of the endless belt as a guide. The volume resistivity of the endless belt is preferably, for example, $1.0\times10^{4}$ Ω·cm or more and $1.0\times10^{12}$ Ω·cm or less.

In the present exemplary embodiment, the volume resistivity (Ω·cm) is measured as follows.

The measurement environment is a temperature of 22° C. and relative humidity of 55%. A sample is placed in the measurement environment for 24 hours or longer and the temperature and humidity are controlled. A micro ammeter (R8430A manufactured by Advantest CORPORATION) is used as a resistance measuring machine, and a UR probe (manufactured by Mitsubishi Chemical Co., Ltd.) is used as a probe. The applied voltage is 1 kV, the application time is 5 seconds, and the load is 1 kgf. For the measurement points, 6 points at equal intervals in the circumferential direction of the endless belt and 3 points at the central portion and both end portions in the width direction of the endless belt, that is, 18 points in total are provided. The arithmetic mean of the measured values at the 18 points is obtained.

In a case where the base material layer contains carbon black, the content of carbon black is preferably, for example, 5 parts by mass or more and 40 parts by mass or less with respect to 100 parts by mass of the polymer material.

The base material layer may contain additives such as antioxidants, cross-linking agents, flame retardants, colorants, surfactants, dispersants, and fillers.

From the viewpoint of durability of the endless belt, the average thickness of the base material layer is, for example, preferably equal to or more than 50 μm, more preferably equal to or more than 75 μm, further preferably equal to or more than 100 μm. In addition, from the viewpoint of flexibility and bending resistance of the endless belt, the average thickness of the base material layer is, for example, preferably equal to or less than 1000 μm, more preferably equal to or less than 700 μm, and further preferably equal to or less than 500 μm.

Surface Layer

The surface layer is preferably, for example, a film or sheet containing a polymer material.

Examples of the polymer material include the above-described rubber and resin described for the base material layer.

The surface layer preferably contains, for example, a urethane resin and fluorine-containing resin particles.

The urethane resin (may also be referred to as a polyurethane or urethane rubber) is generally synthesized by polymerizing polyisocyanate and polyol. For example, the urethane resin preferably has a hard segment and a soft segment.

As the fluorine-containing resin particles, for example, one or more kinds of particles of any of tetrafluoride ethylene resins, ethylene trifluoride chloride resins, propylene hexafluoride resins, vinyl fluoride resins, vinylidene fluoride resins, ethylene difluoride dichloride resins, and copolymers thereof are preferable. Among the above particles, for example, tetrafluoroethylene resin particles are preferable as the fluorine-containing resin particles.

The average primary particle size of the fluorine-containing resin particles is, for example, preferably 10 nm or more and 500 nm or less, more preferably 50 nm or more and 300 nm or less, and further preferably 80 nm or more and 200 nm or less.

In the surface of the surface layer (that is, the outer peripheral surface of the endless belt having the surface layer), for example, the area ratio of the fluorine-containing resin particles is preferably equal to or more than 80%. In a case where the area ratio of the fluorine-containing resin particles is equal to or more than 80%, the toner is less likely to remain on the outer peripheral surface of the endless belt. As a result, toner stains on the recording medium are less likely to occur. From this viewpoint, the area ratio of the fluorine-containing resin particles is, for example, more preferably equal to or more than 85%, and further preferably equal to or more than 90%.

From the viewpoint of transportability of a recording medium on the endless belt, in the surface of the surface layer, the area ratio of the fluorine-containing resin particles is, for example, preferably equal to or less than 95%.

The area ratio of the fluorine-containing resin particles in the surface of the surface layer is obtained by the following method.

The surface of the surface layer (that is, the outer peripheral surface of the endless belt having the surface layer) is observed with an SEM (scanning electron microscope) to obtain an SEM image. Four imaging points at the central portion of the endless belt in the width direction and at equal intervals in the circumferential direction are provided. A 100 μm square region is set in the SEM image, and the region is binarized by image analysis software to set a bright portion as the fluorine-containing resin particle. The area ratio of the fluorine-containing resin particles occupying 100 μm square is calculated, and the arithmetic mean of the area ratios at the four points is obtained.

For the surface of the surface layer, for example, the maximum height Ry of a roughness curve defined by JIS B0601:1994 is preferably equal to or less than 3.4 μm. In a case where the maximum height Ry of the surface of the surface layer is equal to or less than 3.4 μm, the toner is less likely to remain on the outer peripheral surface of the endless belt. As a result, toner stains on a recording medium are less likely to occur. From this viewpoint, the maximum height Ry of the surface of the surface layer is, for example, more preferably equal to or less than 3.0 μm, and further preferably equal to or less than 2.6 μm.

The maximum height Ry of the surface of the surface layer is, for example, preferably equal to or more than 0.1 μm, more preferably equal to or more than 0.5 μm, and further preferably equal to or more than 0.9 μm, from the viewpoint of transportability of a recording medium on the endless belt.

The maximum height Ry of the surface of the surface layer is measured by using a surface roughness measuring machine (for example, SURFCOM (Tokyo Seimitsu Co., Ltd.)) based on the standard of JIS B0601:1994. The measurement direction is the width direction of the endless belt, the measurement length is 2.5 mm, the measurement speed is 0.6 mm/s, the cutoff value is 0.80 mm, and the cutoff filter is the Gaussian filter. A portion of the endless belt is cut out or cut open, and is placed on a horizontal stand with setting the outer peripheral surface upward. Then, the surface roughness is measured. For the measurement points, four points at the central portion in the width direction of the endless belt and at equal intervals in the circumferential direction are provided, and the arithmetic mean of the maximum height Ry at the four points is obtained.

The surface layer may contain additives such as antioxidants, cross-linking agents, flame retardants, colorants, surfactants, dispersants, and fillers.

From the viewpoint of durability of the endless belt, the average thickness of the surface layer is, for example, preferably equal to or more than 0.1 μm, more preferably equal to or more than 0.5 μm, further preferably equal to or more than 1 μm. In addition, from the viewpoint of flexibility and bending resistance of the endless belt, the average thickness of the surface layer is, for example, preferably equal to or less than 50 μm, more preferably equal to or less than 20 μm, and further preferably equal to or less than 10 μm.

Protective Layer

The endless belt according to the present exemplary embodiment may include a protective layer on the inner peripheral surface of the base material layer. For example, the endless belt preferably includes a protective layer on the inner peripheral surface of the base material layer. The protective layer provided on the inner peripheral surface of the base material layer forms the inner peripheral surface of the endless belt.

The protective layer is preferably, for example, a film or sheet containing a polymer material. Examples of the polymer material and other materials include the materials described for the surface layer. The material forming the protective layer may be the identical to the material forming the surface layer.

From the viewpoint of durability of the endless belt, the average thickness of the protective layer is, for example, preferably equal to or more than 0.1 μm, more preferably equal to or more than 0.5 μm, further preferably equal to or more than 1 μm. In addition, from the viewpoint of flexibility and bending resistance of the endless belt, the average thickness of the protective layer is, for example, preferably equal to or less than 50 μm, more preferably equal to or less than 20 μm, and further preferably equal to or less than 10 μm.

Example of Endless Belt

An example of an endless belt includes a conductive elastic layer and a surface layer provided on the outer peripheral surface of the conductive elastic layer. Specific and exemplary embodiments of the conductive elastic layer and the surface layer are as described above.

For the outer peripheral surface of the conductive elastic layer, for example, the maximum height Ry of the roughness curve defined by JIS B0601:1994 is preferably 4.8 μm or less. In a case where the endless belt is slid with the cleaning blade, shear stress is applied to the boundary between the surface layer and the conductive elastic layer, and in a case where the maximum height Ry of the outer peripheral surface of the conductive elastic layer is 4.8 μm or less, it is difficult to concentrate shear stress locally on the inner peripheral surface of the surface layer. Since local concentration of shear stress is less likely to occur on the inner peripheral surface of the surface layer, cracks originating from the inner peripheral surface of the surface layer are less likely to occur. Therefore, the outer peripheral surface of the endless belt is less likely to be rough, and toner stains on the recording medium are less likely to be caused for a long term. From this viewpoint, the maximum height Ry of the outer peripheral surface of the conductive elastic layer is, for example, preferably 4.8 μm or less, more preferably 4.2 μm or less, more preferably 3.4 μm or less, and still more preferably 3.2 μm or less.

The lower limit value of the maximum height Ry of the outer peripheral surface of the conductive elastic layer is, for example, 1.0 μm or more, 2.0 μm or more, and 3.0 μm or more.

For the outer peripheral surface of the conductive elastic layer, with respect to the maximum height Ry of the roughness curve and an average interval Sm of roughness defined by JIS B0601:1994, for example, a ratio Ry/Sm is preferably 0.12 or less. In a case where the surface layer is formed on the outer peripheral surface of the conductive elastic layer, the surface layer tends to be locally thinned at micro convex portions on the outer peripheral surface of the conductive elastic layer, and in a case where the ratio Ry/Sm is 0.12 or less, the local thinning of the surface layer is less likely to occur. As a result, the outer peripheral surface of the endless belt is less likely to be rough, and toner stains on the recording medium are less likely to be caused for a long term. From this viewpoint, the ratio Ry/Sm is, for example, preferably 0.12 or less, more preferably 0.10 or less, and still more preferably 0.08 or less.

The value of the average interval Sm of roughness on the outer peripheral surface of the conductive elastic layer is, for example, 25 μm or more and 50 μm or less, 30 μm or more and 45 μm or less, 35 μm or more and 40 μm or less.

From the viewpoint of the above, for the outer peripheral surface of the conductive elastic layer, with respect to the maximum height Ry of the roughness curve and the average interval Sm of roughness defined by JIS B0601:1994, for example, Ry is preferably 4.8 μm or less and the ratio Ry/Sm is preferably 0.12 or less, Ry is more preferably 4.2 μm or less and the ratio Ry/Sm is more preferably 0.10 or less, Ry is still more preferably 3.4 μm or less and the ratio Ry/Sm is still more preferably 0.08 or less, and Ry is even still more preferably 3.2 μm or less and the ratio Ry/Sm is even still more preferably 0.08 or less.

The maximum height Ry and the average interval Sm of roughness of the outer peripheral surface of the conductive elastic layer are measured by using a surface roughness measuring machine (for example, SURFCOM (Tokyo Seimitsu Co., Ltd.)) based on the standard of JIS B0601:1994. The measurement direction is the width direction of the endless belt, the measurement length is 2.5 mm, the measurement speed is 0.6 mm/s, the cutoff value is 0.80 mm, and the cutoff filter is the Gaussian filter. A portion of the endless belt is cut out or cut open, the surface layer is peeled off to expose the outer peripheral surface of the conductive elastic layer, and the surface roughness is measured by placing the portion of the endless belt on a horizontal stand. For the measurement points, four points at the central portion in the width direction of the endless belt and at equal intervals in the circumferential direction are provided, and the arithmetic mean of Ry (unit: μm) and Sm (unit: μm) at the four points is obtained respectively, and the ratio Ry/Sm is calculated from the average value of Ry and the average value of Sm.

The maximum height Ry of the outer peripheral surface of the conductive elastic layer and the average interval Sm of roughness can be controlled by, for example, the particle size of conductive particles contained in the conductive elastic layer and polishing of the outer peripheral surface of the conductive elastic layer.

Producing Method of Endless Belt

Examples of a producing method of the endless belt include a manufacturing method in which a tubular member serving as a base material layer is prepared and a surface layer is formed on the outer peripheral surface of the tubular member.

As a producing method of the tubular member, there are, for example, extrusion molding in which a composition containing a polymer material and conductive particles is melted and extruded from a die into a belt shape to be solidified; injection molding in which a composition containing the polymer material and conductive particles is melted and put into a belt-shaped mold to be solidified; and coating molding in which a composition containing a precursor or monomer of a polymer material and conductive particles is applied onto a core and solidified.

As a forming method of the surface layer, there are, for example, a method in which a liquid composition containing a polymer material and fluorine-containing resin particles is applied onto the outer peripheral surface of the tubular member and solidified; and a method in which a liquid composition containing a precursor or monomer of the polymer material and fluorine-containing resin particles is applied onto the outer peripheral surface of the tubular member and solidified. In order to solidify the liquid composition, drying, heating, electron beam irradiation, or ultraviolet irradiation may be performed depending on the type of the component.

Further, in order to form the protective layer on the inner peripheral surface of the tubular member, the similar process to the forming method of the surface layer may be performed on the inner peripheral surface of the tubular member.

Cleaning Blade

Figure 4:
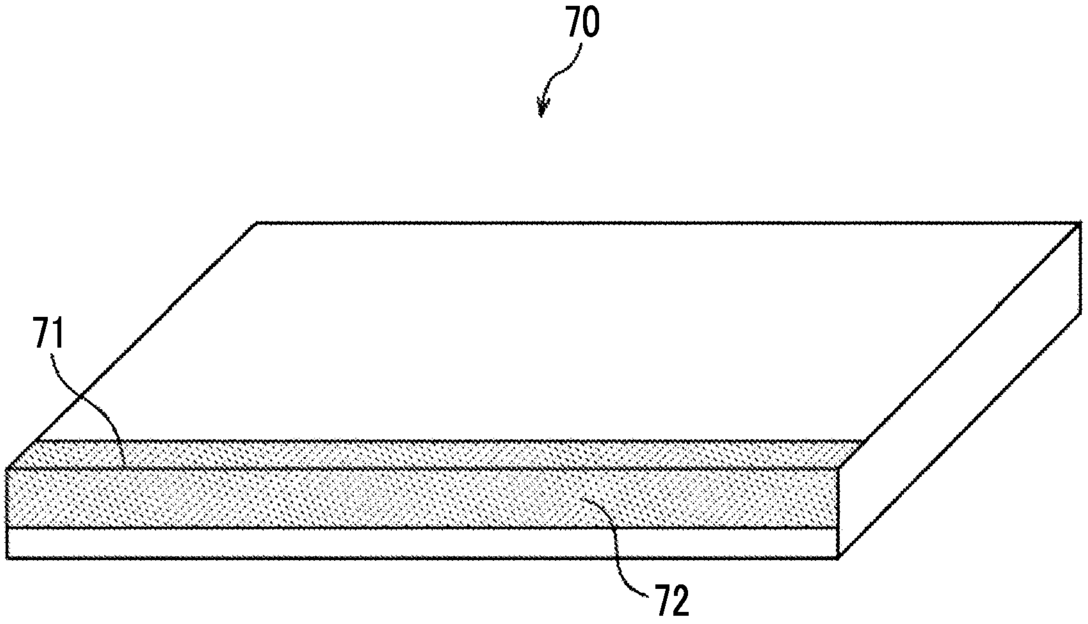
FIG. 4 is a perspective view schematically illustrating an example of a cleaning blade in the image forming apparatus according to the present exemplary embodiment.

FIG. 4 is a perspective view schematically illustrating an example of the cleaning blade. A cleaning blade 70 illustrated in FIG. 4 is a plate-shaped member. The cleaning blade 70 is connected to a toner recovery container and a housing, for example, via a metal shaft.

For example, the cleaning blade 70 preferably uses an elastic member made of a urethane resin (may also be referred to as polyurethane or urethane rubber), polyimide rubber, silicone rubber, fluororubber, propylene rubber, or butadiene rubber as a base material.

As the base material of the cleaning blade 70, for example, the urethane resin is preferable. The urethane resin is generally synthesized by polymerizing polyisocyanate and polyol. The urethane resin preferably has, for example, a hard segment and a soft segment.

In the cleaning blade 70, a long side 71 and the peripheral region are contact portions that come into contact with the endless belt. A surface layer 72 is a layer on the surface of the contact portion that comes into contact with the endless belt. The surface layer 72 is provided on the cleaning blade 70 to cover the long side 71 and the peripheral region and protects the contact portion in contact with the endless belt.

The surface layer 72 is, for example, a tetrahedral amorphous carbon layer, a metal layer, or a metal oxide layer. The surface layer 72 is, for example, preferably the tetrahedral amorphous carbon layer from the viewpoint of reducing the dynamic friction coefficient μ between the endless belt and the cleaning blade 70 to be low.

The thickness of the cleaning blade 70 is, for example, preferably 1 mm or more and 7 mm or less.

The layer thickness of the surface layer 72 is, for example, preferably 0.05 μm or more and 0.3 μm or less, and more preferably 0.1 μm or more and 0.2 μm or less.

The tetrahedral amorphous carbon layer being an example of the surface layer 72 may be formed on the surface of the elastic member by chemical vapor deposition (CVD) or physical vapor deposition (PVD). Specifically, the tetrahedral amorphous carbon layer may be formed by microwave plasma CVD, DC plasma CVD, radio frequency plasma CVD, magnetic field plasma CVD, an ion beam sputtering method, an ion beam vapor deposition method, a reactive plasma sputtering method, an unbalanced magnetron sputtering method, or the like. Examples of the raw material gases used in the above vapor deposition methods include hydrocarbon gases such as methane, ethane, propane, ethylene, benzene, and acetylene; carbon halides such as methylene chloride, carbon tetrachloride, chloroform, and trichloroethane; alcohols such as methyl alcohol and ethyl alcohol; ketones such as acetone and diphenyl ketone; carbon monoxide and carbon dioxide; and gases obtained by mixing $N_2H_2$, $O_2$, $H_2O$, Ar, and the like with the carbon-containing gases. Among the above-described vapor deposition methods, for example, it is preferable to form a tetrahedral amorphous carbon layer by a filtered cathodic vacuum arc (FCVA), which is an ion beam vapor deposition method using an arc plasma source.

In a case where the surface layer 72 is the tetrahedral amorphous carbon layer, the cleaning blade 70 may include a layer other than the tetrahedral amorphous carbon layer. For example, a metal layer or a metal oxide layer may be provided between the elastic member and the tetrahedral amorphous carbon layer for the purpose of improving the fixability of the tetrahedral amorphous carbon layer.

The contact pressure of the cleaning blade 70 with respect to the endless belt is, for example, preferably 0.5 gf/mm or more and 5.0 gf/mm or less. The contact width of the cleaning blade 70 with the endless belt (contact length along the rotation direction of the endless belt) is, for example, preferably 5 μm or more and 100 μm or less. The contact angle of the cleaning blade 70 with respect to the endless belt is, for example, preferably 5° or more and 30° or less.

Next, an example of the image forming apparatus will be described with reference to the drawings. In the following description, the main portions illustrated in the figure will be described, and the description of other portions will be omitted.

Figure 5:
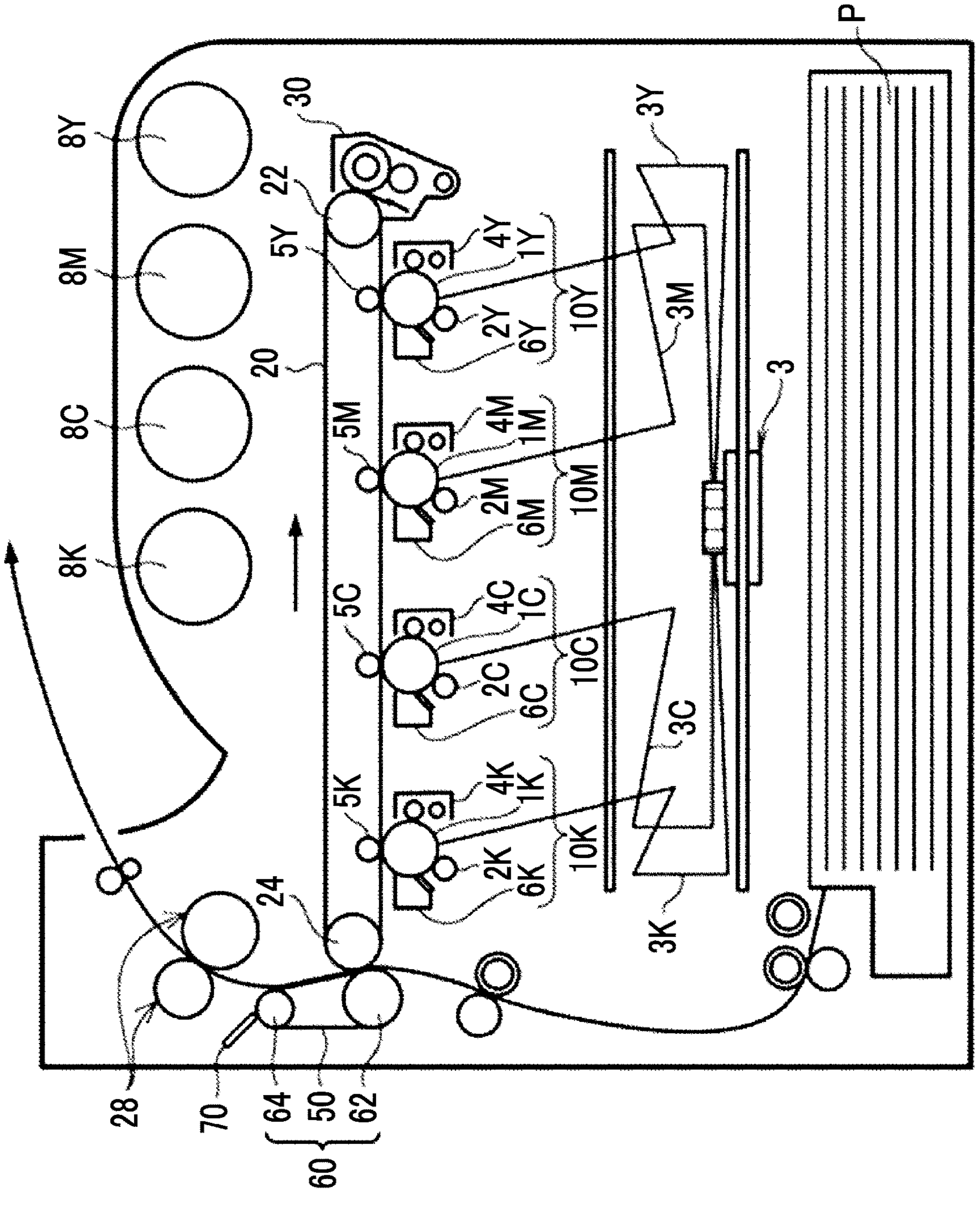
FIG. 5 is a schematic configuration view illustrating an example of the image forming apparatus according to the present exemplary embodiment.

FIG. 5 is a schematic configuration view illustrating an example of the image forming apparatus according to the present exemplary embodiment. In the image forming apparatus illustrated in FIG. 5, the transfer section includes an intermediate transfer member, a primary transfer section that transfers a toner image to the surface of the intermediate transfer member, and a secondary transfer section that transfers the toner image transferred to the surface of the intermediate transfer member to a recording medium. The secondary transfer section includes the endless belt in the present disclosure, and the endless belt in the present disclosure faces the intermediate transfer member.

The image forming apparatus illustrated in FIG. 5 includes first to fourth electrophotographic image forming units 10Y, 10M, 10C, and 10K (image forming section) that output images of colors of yellow (Y), magenta (M), cyan (C), and black (K) based on color-decomposed pieces of image data. The image forming units (may be simply referred to as “units” below) 10Y, 10M, 10C, and 10K are arranged side by side at a predetermined distance from each other in the horizontal direction. The units 10Y, 10M, 10C, and 10K may be process cartridges that are attachable to and detachable from the image forming apparatus.

An intermediate transfer belt (an example of the intermediate transfer member) 20 is provided above the units 10Y, 10M, 10C, and 10K to extend with passing by the units. The intermediate transfer belt 20 is provided by being wound around a drive roll 22 and the support roll 24 that are in contact with the inner surface of the intermediate transfer belt 20. The intermediate transfer belt 20 travels in a direction from the first unit 10Y to the fourth unit 10K. A force is applied to the support roll 24 in a direction away from the drive roll 22 by a spring or the like (not illustrated), and tension is applied to the intermediate transfer belt 20 wound around both the support roll 24 and the drive roll 22. The intermediate-transfer-belt cleaning device 30 is provided on an image holding surface side of the intermediate transfer belt 20 to face the drive roll 22.

Yellow, magenta, cyan, and black toners contained in toner cartridges 8Y, 8M, 8C, and 8K are supplied to developing devices (an example of a developing section) 4Y, 4M, 4C, and 4K of the units 10Y, 10M, 10C, and 10K, respectively.

Since the first to fourth units 10Y, 10M, 10C, and 10K have the equivalent configuration and operation, here, the first unit 10Y that forms a yellow image arranged on the upstream side in a traveling direction of the intermediate transfer belt will be described as a representative.

The first unit 10Y includes a photoconductor 1Y. Around the photoconductor 1Y, a charging roll (an example of a charging section) 2Y that charges the surface of the photoconductor 1Y to a predetermined potential, an exposure device (an example of an electrostatic charge image forming section) 3 that exposes the charged surface by a laser beam 3Y based on a color-decomposed image signal to form an electrostatic charge image, a developing device (an example of the developing section) 4Y that develops the electrostatic charge image by supplying a charged toner to the electrostatic charge image, a primary transfer roll (an example of a primary transfer section) 5Y that transfers a toner image obtained by development onto the intermediate transfer belt 20, and a photoconductor cleaning device 6Y that removes the toner remaining on the surface of the photoconductor 1Y after the primary transfer are arranged in order.

The primary transfer roll 5Y is disposed on the inner side of the intermediate transfer belt 20 and is provided at a position facing the photoconductor 1Y. A bias power source (not illustrated) that applies a primary transfer bias is connected to each of the primary transfer rolls 5Y, 5M, 5C, and 5K in the respective units.

The belt unit 60 is a belt unit including an endless belt 50. The belt unit 60 includes the endless belt 50, a drive roll 62, and a support roll 64. The belt unit 60 is disposed outside the intermediate transfer belt 20 and is provided at a position facing the support roll 24. A bias power source (not illustrated) for applying a secondary transfer bias is connected to the belt unit 60.

A cleaning section for the endless belt 50 is provided in the vicinity of the belt unit 60. The cleaning section includes, for example, a cleaning blade 70, a container (not illustrated) that accommodates the recovered toner, and a housing (not illustrated). The cleaning blade 70 comes into contact with the outer peripheral surface of the endless belt 50 and removes the toner remaining on the outer peripheral surface of the endless belt 50.

The belt unit 60 and the cleaning blade 70 are combined to form the secondary transfer unit. The secondary transfer unit is detachably attached to the image forming apparatus.

The operation of forming a yellow image in the first unit 10Y will be described below.

First, prior to the operation, the surface of the photoconductor 1Y is charged to a potential of −600 V to −800 V by the charging roll 2Y.

The photoconductor 1Y is formed by stacking a photoconductive layer on a conductive base (for example, a volume resistivity of $1\times10^{-6}$ Ωcm or less at 20° C.). The photoconductive layer normally has high resistance (resistance of a general resin) and has a property that, in a case where photoconductive layer is irradiated with a laser beam, the specific resistance of the portion irradiated with the laser beam changes. Thus, the surface of the charged photoconductor 1Y is irradiated with a laser beam 3Y from the exposure device 3 in accordance with image data for yellow, which is transmitted from a control unit (not illustrated). Thus, an electrostatic charge image having a yellow image pattern is formed on the surface of the photoconductor 1Y.

The electrostatic charge image is an image formed on the surface of the photoconductor 1Y by charging. The electrostatic charge image is a so-called negative latent image formed in a manner that the specific resistance of the irradiated portion of the photoconductive layer is reduced by the laser beam 3Y, charged charges on the surface of the photoconductor 1Y flows, and charges at a portion that has not been irradiated with the laser beam 3Y remain.

The electrostatic charge image formed on the photoconductor 1Y rotates to a predetermined development position as the photoconductor 1Y travels. At the development position, the electrostatic charge image on the photoconductor 1Y is developed and visualized as a toner image by the developing device 4Y.

In the developing device 4Y, for example, an electrostatic charge image developer containing at least a yellow toner and a carrier is accommodated. The yellow toner is triboelectrically charged by being agitated inside the developing device 4Y, and is held on a developer roll (an example of a developer holding member) with charges having the same polarity (negative polarity) as the charged charge on the photoconductor 1Y. Since the surface of the photoconductor 1Y passes through the developing device 4Y, the yellow toner is electrostatically adhered to the erased latent image portion on the surface of the photoconductor 1Y, and the latent image is developed by the yellow toner. The photoconductor 1Y on which the yellow toner image is formed is continuously traveled at a predetermined speed, and the toner image developed on the photoconductor 1Y is transported to a predetermined primary transfer position.

In a case where the yellow toner image on the photoconductor 1Y is transported to the primary transfer position, the primary transfer bias is applied to the primary transfer roll 5Y, and an electrostatic force from the photoconductor 1Y toward the primary transfer roll 5Y acts on the toner image. Thus, the toner image on the photoconductor 1Y is transferred onto the intermediate transfer belt 20. The transfer bias applied at this time has a polarity (+) opposite to the polarity (−) of the toner, and is controlled to, for example, +10 μA by the control unit (not illustrated) in the first unit 10Y.

The primary transfer bias applied to the primary transfer roll 5M, 5C, or 5K after the second unit 10M is also controlled based on the first unit.

In this manner, the intermediate transfer belt 20 on which the yellow toner image is transferred by the first unit 10Y is sequentially transported through the second to fourth units 10M, 10C, and 10K. Thus, the toner images of the colors are superimposed and multiplex-transferred.

The intermediate transfer belt 20 on which the toner images of four colors are multiplex-transferred through the first to fourth units reaches a secondary transfer unit configured by the intermediate transfer belt 20, the support roll 24, and the belt unit 60. On the other hand, recording paper (an example of the recording medium) P is fed to a gap at which the belt unit 60 and the intermediate transfer belt 20 are in contact with each other, via a supply mechanism at a predetermined timing, and the secondary transfer bias is applied to the support roll 24. The transfer bias applied at this time has the same polarity (−) as the toner polarity (−), and the electrostatic force from the intermediate transfer belt 20 toward the recording paper P acts on the toner image. Thus, the toner image on the intermediate transfer belt 20 is transferred onto the recording paper P. The secondary transfer bias at this time is determined in accordance with the resistance detected by a resistance detection section (not illustrated) that detects the resistance of the secondary transfer unit. The secondary transfer bias is voltage-controlled.

The belt unit 60 after the toner image is transferred to the recording paper P continuously travels, and the endless belt 50 comes into contact with the cleaning blade 70. The toner remaining on the outer peripheral surface of the endless belt 50 is scraped off by the cleaning blade 70 and collected.

The recording paper P on which the toner image is transferred is sent to a pressure contact portion (nip portion) of a pair of fixing rolls in the fixing device (an example of the fixing section) 28. The toner image is fixed on the recording paper P, and a fixation image is formed. The recording paper P on which the color image has been fixed is carried out to an ejection portion, and a series of color image forming operations is ended.

Examples of the recording paper P to which the toner image is transferred include plain paper used in electrophotographic copying machines, printers, and the like. Examples of the recording medium include an OHP sheet and the like in addition to the recording paper P.

EXAMPLES

The present exemplary embodiment will be more specifically described by providing examples, but the present exemplary embodiment is not limited to the following examples. Unless otherwise specified, synthesis, treatment, production, and the like are performed at room temperature (25° C.±3° C.)

In the following examples, the endless belts in the present disclosure are used as secondary transfer belts.

Preparation of Secondary Transfer Belt (Endless Belt)

Belt A

Preparation of Base Material Layer (Conductive Elastic Layer)

A conductive rubber material containing carbon black in chloroprene rubber and ethylene propylene diene rubber are mixed. A mixture is extruded and molded by a kneading extruder, and dried with hot air to obtain a tubular body having a diameter (outer diameter) of 40 mm and an average thickness of 450 μm. The tubular body is cut to a length of 355 mm and used as a base material A.

Formation of Surface Layer

1% by mass of a curing agent (LOCTITE WH-1, Henkel Japan Ltd.) is added to a urethane resin containing polytetrafluoroethylene (PTFE) (BONDERITE T862A, Henkel Japan Ltd.) and diluted with water to prepare the amount of PTFE to 10% by mass. This is used as a coating liquid.

The coating liquid is sprayed on the outer peripheral surface of the base material A while rotating the base material A with the central axis of the base material A in the horizontal direction. Then, hot air drying is performed at a temperature of 150° C. for 35 minutes to form a surface layer. The average thickness of the surface layer is 7 μm.

Then, the same coating liquid is sprayed on the inner peripheral surface of the base material A, and hot air drying is performed in the similar manner to form a protective layer. The average thickness of the protective layer is 5 μm. The resultant is used as a belt A.

Belt B

A belt B is prepared in the similar manner to the manner of preparing the belt A except that the amount of PTFE of the coating liquid is changed to 18% by mass.

Belt C

A belt C is prepared in the similar manner to the manner of preparing the belt A except that the amount of PTFE of the coating liquid is changed to 3% by mass.

Belt D

A belt D is prepared in the similar manner to the manner of preparing the belt A except that the base material A is changed to the following base material D.

Base Material D

A conductive material containing carbon black in thermoplastic polyurethane is extruded and molded by a kneading extruder and dried with hot air to obtain a tubular body. The tubular body is cut to obtain a base material D. The dimensions of the base material D are equal to the dimensions of the base material A.

Belt E

A belt E is prepared in the similar manner to the manner of preparing the belt A except that the PTFE-containing urethane resin (BONDERITE T862A, Henkel Japan Ltd.) is changed to a PTFE-free urethane resin (T845C, Henkel Japan Ltd.).

Belt F

The secondary transfer belt of the image forming apparatus Iridesse Digital Press (manufactured by FUJIFILM Business Innovation Corp.) is used as a belt F.

Belt G

A belt G is prepared in the similar manner to the manner of preparing the belt A except that a material in which the outer peripheral surface of the base material A is polished with wrap film #4000 (manufactured by 3M) is used as a base material.

Preparation of Cleaning Blade

Cleaning Blade A

Preparation of Elastic Member

The first polycaprolactone polyol (manufactured by Daicel Corporation, PRAXEL 205, average molecular weight of 529, hydroxyl value of 212 KOHmg/g) and the second polycaprolactone polyol (manufactured by Daicel Co., Ltd., PRAXEL 240, average molecular weight of 4155, hydroxyl value of 27 KOHmg/g) are used as a soft segment material for the polyol component. An acrylic resin containing two or more hydroxy groups (ACTFLOW UMB-2005B, manufactured by Soken Chemical & Engineering Co., Ltd.) is used as a hard segment material. The soft segment material and the hard segment material are mixed at a mass ratio of 80:20.

6.26 parts of 4,4'-diphenylmethane diisocyanate (MILLIONATE MT manufactured by Nippon Polyurethane Industry Co., Ltd.) are added as an isocyanate compound to 100 parts of the mixture of the soft segment material and the hard segment material, and the mixture is caused to react in a nitrogen atmosphere at a temperature of 70° C. for 3 hours. Then, 34.3 parts of the isocyanate compound are further added, and the mixture is caused to react in a nitrogen atmosphere at a temperature of 70° C. for 3 hours to obtain a prepolymer. Then, the prepolymer is heated to 100° C. and defoamed under reduced pressure for 1 hour. Then, 7.14 parts of a mixture of 1,4-butanediol and trimethylolpropane (mass ratio 60:40) are added to 100 parts of the prepolymer, are mixed well for 3 minutes so as to prevent bubbles from entering. The mixture obtained in this manner is poured into a cleaning blade mold to obtain an elastic member.

Isocyanate Impregnation

The elastic member is immersed in a solution in which 20 parts by mass of 4,4'-diphenylmethane diisocyanate are dissolved in 20 parts by mass of ethyl acetate, for 15 minutes and then removed from the solution. After wiping off the solution on the surface of the elastic member, the elastic member is heated at 100° C. for 1 hour to form a crosslinked layer on the surface layer of the elastic member. In cutting the elastic member and observing the cross section, a layer having a different color from the inside is checked on the surface layer, and it is confirmed that the surface layer is made to a crosslinked layer.

The resultant is used as a cleaning blade A. The cleaning blade A has adhered to a SUS support member.

Cleaning Blade B

Preparation of Elastic Member

The same elastic member as the elastic member in the cleaning blade A is prepared.

Formation of Tetrahedral Amorphous Carbon Layer

A metal oxide layer (specifically, a titanium oxide layer) is first formed as an adhesive layer on a contact portion of the elastic member with the secondary transfer belt by a vacuum vapor deposition method.

Then, using an FCVA device manufactured by Shimadzu Corporation, carbon plasma is generated by vacuum arc discharge of graphite. Tetrahedral amorphous coating is performed by FCVA that causes extraction and deposition of ionized carbon from the carbon plasma. The film formation temperature is 40° C. or higher and 80° C. or lower, and the film formation rate is 1.5 nm/sec.

The resultant is used as a cleaning blade B. The cleaning blade B has adhered to the SUS support member.

Examples 1 to 7 and Comparative Example 1

The secondary transfer belt and the cleaning blade are combined with the combination shown in Table 1 to prepare the secondary transfer unit, and the prepared secondary transfer unit is mounted on a modified machine of the image forming apparatus DocuColor-7171P (FUJIFILM Business Innovation Corp.). A guide for transporting a recording medium is attached to the end portion of the secondary transfer belt, and the transport speed of the recording medium is adjusted to be constant. The contact pressure of the cleaning blade is adjusted to be constant.

Performance Evaluation of Image Forming Apparatus

Surface Roughness of Outer Peripheral Surface of Conductive Elastic Layer

The surface layer is peeled off from the secondary transfer belt, and the sample in which the outer peripheral surface of the conductive elastic layer is exposed is prepared. Using SURFCOM 1400G (Tokyo Seimitsu Co., Ltd.), the surface roughness is measured by the above-described measurement method based on the standard of JIS B0601:1994, and the maximum height Ry the average interval Sm of roughness, and the ratio of Ry/Sm are obtained. Table 1 shows the values.

Area Ratio of Fluorine-containing Resin Particles on Surface of Surface Layer

A portion of the secondary transfer belt is cut out and used as a sample, and the area ratio of the fluorine-containing resin particles is obtained by the measurement method described above. Table 1 shows the values.

Surface Roughness of Outer Peripheral Surface of Secondary Transfer Belt

Using SURFCOM 1400G (Tokyo Seimitsu Co., Ltd.), the surface roughness is measured by the above-described measurement method based on the standard of JIS B0601:1994, and the maximum height Ry is obtained. Table 1 shows the values.

Wind Pressure at which Uncharged Toner Scatters from Outer Peripheral Surface of Secondary Transfer Belt +9 kV is applied to the black toner (manufactured by FUJIFILM Business Innovation Corp.) of DocuColor-7171P to erase static electricity, and an uncharged toner is prepared. Using the uncharged toner, the wind pressure at which the uncharged toner scatters from the outer peripheral surface of the belt is measured by the measurement method described above. Table 1 shows the values.

Dynamic Friction Coefficient μ of Contact Portion between Secondary Transfer Belt and Cleaning Blade Using HEIDON tribo gear TYPE14 (Shinto Scientific Co., Ltd.), the dynamic friction force is measured by the measurement method described above, and the dynamic friction coefficient μ is obtained. Table 1 shows the values.

Stain on Back Surface of Recording Medium 10,000 CMYK color images with image density of 5% are output on A4 size plain paper. Then, a sheet of A3 size plain paper is caused to pass through the image forming apparatus. The back side of the A3 size plain paper is visually observed with a loupe, and stains are classified as follows. Table 1 shows the results.

G1: No stain is recognized visually or by the loupe.

G2: There is a stain that is not visually found but is visible on the loupe.

G3: There is a stain that is visually recognized.

TABLE 1

| | | Secondary transfer belt | | | | | | | | |
|---|---|---|---|---|---|---|---|---|---|---|
| | | | Outer peripheral surface of conductive elastic layer | | | Surface layer | Outer peripheral surface of belt | | Dynamic friction coefficient | Stain on |
| | Cleaning blade Type — | Type — | Maximum height Ry μm | Average interval Sm of roughness μm | Ry/Sm — | Area ratio of fluorine-containing resin particles % | Maximum height Ry μm | Wind pressure at uncharged toner scatters kPa | μ between endless belt and cleaning blade — | back surface of recording medium — |
| Example 1 | A | A | 4.0 | 40 | 0.10 | 82.0 | 3.2 | 18.6 | 0.16 | G2 |
| Example 2 | A | B | 4.0 | 40 | 0.10 | 88.0 | 1.8 | 16.0 | 0.11 | G1 |
| Example 3 | A | C | 4.0 | 40 | 0.10 | 80.0 | 2.2 | 22.0 | 0.20 | G2 |
| Example 4 | A | D | 4.0 | 40 | 0.10 | 82.0 | 0.2 | 20.0 | 0.13 | G1 |
| Example 5 | A | E | 4.0 | 40 | 0.10 | 0.0 | 0.9 | 22.0 | 0.25 | G2 |
| Example 6 | B | A | 4.0 | 40 | 0.10 | 82.0 | 3.2 | 18.6 | 0.16 | G2 |
| Example 7 | A | G | 3.2 | 40 | 0.08 | 82.0 | 3.2 | 18.6 | 0.12 | G1 |
| Comparative Example 1 | A | F | 4.9 | 38 | 0.13 | 55.0 | 4.6 | 32.0 | 0.38 | G3 |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a photoconductor;

a charging section configured to charge a surface of the photoconductor;

an electrostatic charge image forming section configured to form an electrostatic charge image on the charged surface of the photoconductor;

a developing section configured to accommodate a developer containing a toner and develops the electrostatic charge image formed on the surface of the photoconductor by using the developer to form a toner image;

a transfer section including an endless belt and configured to transfer the toner image to a recording medium; and a cleaning section including a cleaning blade that comes into contact with an outer peripheral surface of the endless belt and performs cleaning of the outer peripheral surface of the endless belt with the cleaning blade, wherein a dynamic friction coefficient μ between the outer peripheral surface of the endless belt and the cleaning blade is 0.10 or more and 0.25 or less as measured at a temperature of 22° C. and a relative humidity of 55%, and the transfer section includes an intermediate transfer member, a primary transfer section configured to transfer the toner image to a surface of the intermediate transfer member, and a secondary transfer section that includes the endless belt facing the intermediate transfer member and is configured to transfer the toner image transferred to the surface of the intermediate transfer member to the recording medium.

2. The image forming apparatus according to claim 1, wherein the dynamic friction coefficient μ is 0.11 or more and 0.20 or less.

3. The image forming apparatus according to claim 1, wherein the endless belt includes a conductive elastic layer and a surface layer provided on an outer peripheral surface of the conductive elastic layer.

4. The image forming apparatus according to claim 2, wherein the endless belt includes a conductive elastic layer and a surface layer provided on an outer peripheral surface of the conductive elastic layer.

5. The image forming apparatus according to claim 3, wherein a surface of the surface layer has a maximum height Ry of a roughness curve, which is equal to or less than 3.4 μm, the roughness curve being defined by JIS B0601:1994.

6. The image forming apparatus according to claim 4, wherein a surface of the surface layer has a maximum height Ry of a roughness curve, which is equal to or less than 3.4 μm, the roughness curve being defined by JIS B0601:1994.

7. The image forming apparatus according to claim 3, wherein a surface of the surface layer has a maximum height Ry of a roughness curve, which is 0.1 μm or more and 2.6 μm or less, the roughness curve being defined by JIS B0601:1994.

8. The image forming apparatus according to claim 4, wherein a surface of the surface layer has a maximum height Ry of a roughness curve, which is 0.1 μm or more and 2.6 μm or less, the roughness curve being defined by JIS B0601:1994.

9. The image forming apparatus according to claim 5, wherein a surface of the surface layer has a maximum height Ry of a roughness curve, which is 0.1 μm or more and 2.6 μm or less, the roughness curve being defined by JIS B0601:1994.

10. The image forming apparatus according to claim 6, wherein a surface of the surface layer has a maximum height Ry of a roughness curve, which is 0.1 μm or more and 2.6 μm or less, the roughness curve being defined by JIS B0601:1994.

11. The image forming apparatus according to claim 3, wherein the outer peripheral surface of the conductive elastic layer has a maximum height Ry of a roughness curve and an average interval Sm of roughness, which are defined by JIS B0601:1994, in which Ry is 3.4 μm or less and a ratio Ry/Sm is 0.08 or less.

12. The image forming apparatus according to claim 4, wherein the outer peripheral surface of the conductive elastic layer has a maximum height Ry of a roughness curve and an average interval Sm of roughness, which are defined by JIS B0601:1994, in which Ry is 3.4 μm or less and a ratio Ry/Sm is 0.08 or less.

13. The image forming apparatus according to claim 5, wherein the outer peripheral surface of the conductive elastic layer has a maximum height Ry of a roughness curve and an average interval Sm of roughness, which are defined by JIS B0601:1994, in which Ry is 3.4 μm or less and a ratio Ry/Sm is 0.08 or less.

14. The image forming apparatus according to claim 3, wherein the conductive elastic layer contains carbon black and at least one of chloroprene rubber or epichlorohydrin rubber.

15. The image forming apparatus according to claim 3, wherein the surface layer contains a urethane resin and fluorine-containing resin particles.

16. The image forming apparatus according to claim 15, wherein, in a surface of the surface layer, an area ratio of the fluorine-containing resin particles is equal to or more than 80%.

17. The image forming apparatus according to claim 1, wherein the cleaning blade includes an elastic member formed of a urethane resin, and a tetrahedral amorphous carbon layer provided at a contact portion that is a surface of the elastic member and comes into contact with the endless belt.

18. A transfer unit that is attached to and detached from an image forming apparatus, the transfer unit comprising:

a transfer section including an endless belt and configured to transfer a toner image to a recording medium; and a cleaning section including a cleaning blade that comes into contact with an outer peripheral surface of the endless belt and configured to perform cleaning of the outer peripheral surface of the endless belt with the cleaning blade, wherein a dynamic friction coefficient μ between the outer peripheral of the endless belt and the cleaning blade is 0.10 or more and 0.25 or less as measured at a temperature of 22° C. and a relative humidity of 55%, and the transfer section includes an intermediate transfer member, a primary transfer section configured to transfer the toner image to a surface of the intermediate transfer member, and a secondary transfer section that includes the endless belt facing the intermediate transfer member and is configured to transfer the toner image transferred to the surface of the intermediate transfer member to the recording medium.

19. The transfer unit according to claim 18, which is a secondary transfer unit.

* * * * *